Patented Dec. 17, 1935

2,024,357

UNITED STATES PATENT OFFICE 2,024,357

METHOD OF MAKING CAKE

Benjamin R. Harris, Chicago, Ill.

No Drawing. Application May 31, 1934,
Serial No. 728,245

19 Claims. (Cl. 99—10)

My invention relates to improved flour products such as cakes, biscuits, and the like, together with materials employed therein.

The principal object of my invention is the provision of an improved baked flour product.

Another object is to make a better cake.

A further object is the production of an improved flour batter.

Another object is the utilization of a new class of materials for improving the characteristics of flour products.

Other objects will appear from various features of the invention hereinafter disclosed.

In producing cake, one form of baked flour product to which the present invention relates, it is customary in a typical formula to form a batter emulsion from flour, aqueous material, sugar, shortening, whole eggs, and other ingredients, the yolk portion of the eggs comprising an emulsifying agent. Water soluble materials, such as sugar, are dissolved in the aqueous material such as milk and whole eggs, and in general a limitation in the amount of aqueous liquid forms a limitation in the amount of water soluble materials which can be used. In cake making, if a greater amount of liquid is to be added to the formula, the proportionate amount of egg yolk material must be increased. I have discovered that if a relatively small proportion of a substance of a class hereinafter described be incorporated in the flour batter, a better, smoother batter is obtained and the amount of aqueous liquid employed (and concomitantly the proportion of water soluble materials such as sugar) may be increased without increasing the amount of yolk material or other normal emulsifying agent employed in the formula. Many other advantages are obtained, some of which will be pointed out hereinafter.

In carrying out the present invention, I employ a hydrophyllic lipin comprising one of a class of materials consisting of organic phosphates, sulphates, and sulphonic acid derivatives, which substances, when employed in the manner hereinafter particularly pointed out, will secure many advantages in baking. Each substance of the class identified has both a lipophile and hydrophile group in the molecule; the lipophile group being any group having a definite affinity for oils and fats; and the hydrophile group comprising essentially at least one phosphate, sulphate, or sulphonic acid radical and their innocuous salts.

These substances may be introduced in the flour batters in a number of different ways with similar, although modified, results, in each instance. For example, they may be incorporated in any of the ingredients employed in the flour batter, including the shortening, egg material, flour, accessory materials, or in fact any material commonly used in baking and employable in the formula at hand.

The substances which I employ are essentially hydrophyllic lipins in that they include a lipophile group, that is to say, a group having an affinity for oils and fats, and a hydrophile group or a group having an affinity for aqueous media. I wish it understood, however, that I employ here in the term "hydrophyllic lipin" in a broad sense to include materials which may have anti-spattering powers when used in margarine, as described in my Patent No. 1,917,256; the term being employed in a broader sense than in my prior Patent No. 1,917,254.

The sulphate substances which I employ are esters of sulphuric acid in which the esterification takes place preferably through a terminal hydroxy radical attached to a lipophile group. One example is the direct esterification of a relatively high molecular weight alcohol by sulphuric acid, in which substances like cetyl sulphate, having the general formula $ROSO_3H$, are produced. The sulphates may also be esters of derivatives of polyhydroxy substances having a lipophile group. For example, esters or ethers of glycerine having a relatively high molecular weight lipophile group and at least one free hydroxy group may be treated with sulphuric acid to esterify a remaining hydroxy group and produce substances adapted for use in my present invention. As an example, monostearine may be esterified with sulphuric acid to produce monostearine sulphate sodium salt which can be employed satisfactorily in my present invention.

As an example of one manner of producing a hydrophyllic lipin having a sulphate group, a free fatty acid such as stearic acid, palmitic acid, or lauric acid, or mixtures of various fatty acids, is mixed with glycerine in excess of the amount calculated to produce the mono-ester, and the mass heated together at approximately 220° C. with agitation for four hours, in a non-oxidizing atmosphere. This produces a fatty acid mono-ester of glycerine, which, after drawing off the excess glycerine, is then intimately mixed with sulphuric acid at room temperature, and allowed to react until the sulphuric acid ester is formed at the hydroxy group. In the case of relatively high molecular weight saturated fatty acids, like stearic acid, 2 to 3 parts by weight of sulphuric acid may be mixed with the mono-ester, and allowed to stand for about 15 hours. When unsaturated lipophile groups are present, care must be taken that the sulphuric acid group be attached at a hydroxy group of the glycerine rather than at the double bond. The final sulphate substance is washed thoroughly, and preferably is neutralized to form the sodium salt. In place of sulphuric acid, sulphur trioxide, chlorsulphonic acid, sulphuryl chloride, or other "sulphonating" agents may be employed, under appropriate conditions, to produce the sulphate esters.

According to another example, a naturally occurring triglyceride, such as cotton seed oil, may be treated with a proportion of glycerine, preferably in the presence of a catalyst and at elevated temperature to cause a re-esterification resulting in the formation of essentially a mixture of mono- and di-glycerides of the fatty acids present. The mixture of mono- and di-esters may then be treated with chlorsulphonic acid, or some other "sulphonating" agent to form a mixture of sulphuric acid esters. The conditions should be such that "sulphonation" will preferably not occur at the double bonds, assuming double bonds to be present, such as the use of low temperatures, for example below 0° C. The sulphonated product is washed with brine and neutralized. The oil or fat employed may be hydrogenated completely or in part, or it may be employed without hydrogenation.

A substance very suitable for my purpose is a mixture of polyglycerol mono- or di-esters, sulphated at one or more hydroxy groups to increase the hydrophyllic character of the substance. As an example of the preparation of this class of material, I add about 1% of an alkali catalyst to water-free glycerine, and heat the same at about 260° C. with agitation and in an inert atmosphere for approximately four to four and one-half hours. This produces a mixture of polyglycerols which may then be esterified with fatty acids to form polyglycerol esters having free OH groups. The latter substances are then treated with sulphuric acid, or other "sulphonating" agent, to esterify one or more of said OH groups, thereby forming a material which, after purification and neutralization with an alkali to form an innocuous salt, may be used in my invention to increase the ratio of liquid present in a flour batter.

According to one example, 60 parts of hydrogenated cottonseed oil (melting at approximately 102° F.) are mixed with 40 parts of polyglycerols prepared as described above together with .06 parts of caustic soda as a catalyst. The entire mixture is heated to about 250° C., with stirring and in the absence of air, for about two hours. This product is then allowed to cool and settle, and is found to be a mixture of polyglycerol esters having free OH groups. The small underlying layer of excess polyglycerol is drawn off and discarded. This mixture is then washed by dispersing it in hot water and salting it out with 3% of sodium chloride. This washing procedure is repeated twice and the product is finally dried. 500 parts of this dried product are chilled with solid $CO_2$ in a dough type of mixer, and treated slowly with 150 parts of chlorsulphonic acid. During the entire sulphonation, the mixture is thoroughly and continuously mixed and the temperature is maintained at about $-10°$ C. When all of the chlorsulphonic acid is in, the mixture is hydrated by mixing in finely crushed ice and neutralized with aqueous caustic soda solution. This product may be further purified by dispersing it in hot water and salting out with sodium chloride. The paste thus obtained may be incorporated in aqueous media such as egg whites, whole egg or yolk material, or it may be dried and then incorporated in non-aqueous media such as shortening. The product is rather freely dispersible in water, and functions at the water oil interface of an emulsion to stabilize the same and consists to a large extent of substances comprising a fatty acid radical linked to a hydrophile sulphate radical by means of a radical derived from an organic polyhydroxy substance.

Similar substances may be made by means of the same general method, employing polyglycerides prepared as above, with other oils, fats, waxes, fatty acids and other fatty materials. Examples of such materials are corn oil, leaf lard, oleostearine, stearic acid, hydrogenated oils, palm oil and the like. In each case, the proportions employed may be modified somewhat, and time and temperature changed, if necessary, to suit conditions.

The glycerol derivatives have been referred to in the previous paragraph by way of example. They are in general either ethers and esters or double esters of glycerine (or polyglycerols) having lipophile groups and sulphate hydrophile groups. It is, of course, understood that any polyhydroxy substance may be employed under suitable conditions in place of glycerine to produce similar substances adapted for use in the present invention, as, for example, glycols, polyglycols, hydroxy carboxylic acids, sugars, and sugar alcohols.

I have found that by substituting a sulphate radical for at least one hydroxyl group in certain hydrophillic lipin substances having relatively high molecular weight lipophile groups and at least one free hydroxy group, greater hydrophyllic character is imparted to the molecule in each case and improved results are obtained when such more hydrophyllic sulphate materials are employed in flour batters. The sulphate substances hereinabove described, therefore, are in the nature of hydroxy hydrophillic lipins, wherein at least one hydroxy group is esterified with a sulphate radical.

The phosphate substances which I employ are substantially identical with the sulphate substances described hereinabove with the exception that a hydrophile phosphate group is substituted in place of a sulphate group. In other words, a hydrophile phosphoric acid ester of any of the hydroxy substances disclosed above can be employed in place of a hydrophile sulphuric acid ester. Examples are phosphoric acid esters of relatively high molecular weight alcohols such as lauryl, cetyl, and octodecyl alcohols; phosphoric acid esters of derivatives of polyhydroxy substances having a lipophile group and at least one hydroxy group, such as monostearine phosphate, stearyl diethylene glycol phosphate, lauryl glyceryl ether phosphate, and the like.

The phosphate substances which I employ may be anti-spatterers of the character described in my prior Patent No. 1,917,259, or they may have lipophile and hydrophile groups which are insufficiently "balanced" to prevent spattering. The important characteristics of the phosphate substances is that they have a lipophile group of relatively high molecular weight, having at least eight carbon atoms, as the examples illustrate, and a hydrophile group consisting essentially of the phosphate group. The lipophile group and phosphate group may be directly joined as in a simple monatomic alcohol ester, or the residue of a polyhydroxy compound may comprise a linkage, such polyhydroxy compounds being polyhydric alcohols, isomers or polymers thereof, sugars, hydroxy carboxylic acids, sugar alcohols, and the like. The phosphates employed may be pure substances, or they may be mixtures, such as those formed by re-esterifying a natural oil with an excess of glycerine or polyglycerols, and forming hydrophile phosphate esters of the resulting substances.

The hydrophyllic lipin phosphates which are useful for the purposes of my invention, may be prepared in various ways, some examples of which are as follows:

1. Reacting phosphorus pentoxide, phosphorus oxychloride, phosphorus pentachloride with a hydroxy group of a more or less lipophile molecule, in the presence of a solvent or condensing agent when required.

2. Reacting a phosphate of water soluble polyhydroxy substances, such as glycerophosphates, glycolphosphates, dextrose phosphates, etc., with fatty acid chlorides such as lauryl chloride, oleyl chloride, stearyl chloride and the like, in the presence of a solvent or condensing agent.

3. Re-esterifying a more or less lipophile molecule having a hydroxy group, with ethyl metaphosphate.

I list below a number of additional illustrative examples of substances with esterifiable hydroxy groups to which I impart additional hydrophillic properties by introducing therein a sulphate, phosphate, or sulphonic acid radical in order to produce materials useful for the purposes of the invention herein disclosed:

$CH_3—(CH_2)_6—CH_2OH$     Octyl Alcohol
$CH_3—(CH_2)_{10}—CH_2OH$     Dodecyl Alcohol
$CH_3—(CH_2)_{14}—CH_2OH$     Hexadecyl Alcohol
$C_{27}H_{45}OH$     Cholesterol

 Monostearin $C_{13}H_{27}—\overset{O}{\overset{\|}{C}}—O—CH_2—\underset{OH}{CH}—CH_2—O—CH_2—\underset{OH}{CH}—CH_2OH$     Diglycerol monomyristate $CH_3—(CH_2)_{10}—CH_2—O—CH_2—\underset{OH}{CH}—CH_2OH$     Dodecyl glycerol ether $C_{15}H_{31}—\overset{O}{\overset{\|}{C}}—O—CH_2—\underset{OH}{CH}—CH_2—O—\overset{O}{\overset{\|}{C}}—C_{15}H_{31}$     Dipalmitin $CH_3—(CH_2)_{16}—CH_2—O—CH_2—CH_2—O—CH_2—CH_2—OH$     Octodecyl diethylene glycol ether $C_{17}H_{35}—\overset{O}{\overset{\|}{C}}—O—CH_2—\underset{OH}{CH}—\overset{O}{\overset{\|}{C}}—OH$     Glyceric acid monostearate $C_{17}H_{35}—\overset{O}{\overset{\|}{C}}—O—CH_2—(CHOH)_4—CH_2OH$     Sorbitol mono-oleate Dextrose Monostearate
Triglycerol distearate While the examples are single substances, it is to be understood that in practice, I find it much more convenient, in general, to employ mixtures, some of the more important of which I describe herein.

The sulphonic acid substances which I employ are similar in many respects to the sulphate and phosphate substances, particularly in their structure and physical chemical characteristics. They have at least one lipophile radical and hydrophile radical, the latter portion of the molecule consisting primarily of the sulphonic acid group. Among such substances are alkyl sulphonic acids having the general composition $RSO_2OX$, wherein R is an alkyl radical having at least four carbon atoms, and X is a cation such as hydrogen, sodium, calcium, ammonium, or the like. Sulphonic acid derivatives may also be used such as esters of relatively low molecular weight sulphonic acid and a hydroxy substance having a lipophile radical.

Some sulphonic acid derivatives which I employ may be considered as compounds in which sulphonic acid radicals are substituted for hydroxy groups, in the same manner and in the same type of substances as described above in connection with the sulphates and phosphates. Such a substance may be formed by the esterification of a sulphonic acid derivative of a low molecular weight carboxylic acid with a relatively high molecular weight alcohol, producing a final product like cetyl sulpho-acetate (neutralized to form the sodium salt). I may also employ derivatives of sulphonic acids which comprise essentially polyhydroxy substances having a lipophile group replacing at least one hydroxy radical, and a low molecular weight sulphonic acid esterified at a second hydroxy radical. Examples of substances of this character are palmityl trimethylene glycol sulphoacetate, monolauryl glycerol sulphopropionate, and the like.

Other examples of sulphonic acid derivatives which can be employed are set forth in Patent No. 1,917,260.

Although the preceding disclosure is believed to be ample to teach those skilled in the art the classes of substances used in my invention, and to suggest readily to the skilled chemist, individual substances coming within the various sub-classes, I list below typical illustrative examples which are usable with good results:

$CH_3—(CH_2)_{10}—CH_2—O—\underset{\diagdown ONa}{\overset{O}{\overset{\|}{S}}=O}$     Dodecyl sodium sulphate $CH_3—(CH_2)_{14}—CH_2—O—\underset{\diagdown ONa}{\overset{O}{\overset{\|}{S}}=O}$     Hexadecyl sodium sulphate $C_{27}H_{45}O—\underset{\diagdown ONa}{\overset{O}{\overset{\|}{S}}=O}$     Cholesteryl sodium sulphate

| | |
|---|---|
| $C_{17}H_{35}-\overset{O}{\underset{\|}{C}}-O-CH_2-CHOH-CH_2-O-\overset{O}{\underset{\|}{S}}=O$<br>$\phantom{C_{17}H_{35}-C-O-CH_2-CHOH-CH_2-O-S=}ONa$ | Monostearin sodium sulphate |
| $H_2C-O-\overset{O}{\underset{\|}{C}}-C_{15}H_{31}$<br>$HC-O-\overset{O}{\underset{\|}{S}}=O$<br>$\phantom{HC-O-S=}ONa$<br>$H_2C-O-\overset{O}{\underset{\|}{C}}-C_{15}H_{31}$ | Dipalmitin sodium sulphate |
| $C_{13}H_{27}-\overset{O}{\underset{\|}{C}}-O-CH_2-CHOH-CH_2-O-CH_2-CHOH-CH_2O-\overset{O}{\underset{\|}{S}}-ONa$ | Monomyristyl diglycerol sulphate (sodium salt) |
| $CH_3(CH_2)_{10}-CH_2-O-CH_2-CHOH-CH_2-O-\overset{O}{\underset{O}{S}}-ONa$ | Dodecyl glycerol ether sulphate (sodium salt) |
| $CH_3-(CH_2)_{16}-CH_2-O-CH_2-CH_2-O-CH_2-CH_2-O-\overset{O}{\underset{O}{S}}-ONa$ | Octodecyl diethyleneglycol ether sulphate (sodium salt) |
| $C_{17}H_{35}-\overset{O}{\underset{\|}{C}}-O-CH_2-CH-O-\overset{O}{\underset{\|}{S}}-ONa$<br>$\phantom{C_{17}H_{35}-C-O-CH_2-}O=C-ONa$ | Monostearyl glyceric acid sulphate (sodium salt) |
| $C_{17}H_{33}-\overset{O}{\underset{\|}{C}}-O-CH_2-(CHOH)_4-CH_2-O-\overset{O}{\underset{\|}{S}}-ONa$ | Mono-oleyl sorbitol sulphate (sodium salt) |
| $CH_3-(CH_2)_6-CH_2-O\diagdown\overset{O}{\underset{\|}{P}}$<br>$CH_3-(CH_2)_6-CH_2-O\diagup\phantom{P}\diagdown ONa$ | Dioctyl sodium phosphate |
| $CH_3-(CH_2)_{12}-CH_2-O-\overset{O}{\underset{ONa}{P}}-ONa$ | Tetradecyl disodium phosphate |
| $C_{17}H_{35}-\overset{O}{\underset{\|}{C}}-CH_2-CHOH-CH_2-O-\overset{O}{\underset{ONa}{P}}-ONa$ | Monostearin disodium phosphate |
| $C_{17}H_{33}-\overset{O}{\underset{\|}{C}}-CH_2-CHOH-CH_2-O-CH_2-CHOH-CH_2-O-\overset{O}{\underset{ONa}{P}}-ONa$ | Mono-oleyl diglycerol phosphate (sodium salt) |
| $CH_3-(CH_2)_{14}-CH_2-O-CH_2-CHOH-CH_2-O-\overset{O}{\underset{ONa}{P}}-ONa$ | Hexadecyl glycerol ether phosphate (sodium salt) |
| $CH_3-(CH_2)_{10}-CH_2-O-CH_2-CH_2-O-CH_2-CH_2-O-\overset{O}{\underset{ONa}{P}}-ONa$ | Dodecyl diethyleneglycol ether phosphate (sodium salt) |
| $C_{17}H_{33}-\overset{O}{\underset{\|}{C}}-O-CH_2-(CHOH)_4-CH_2-O-\overset{O}{\underset{ONa}{P}}-ONa$ | Mono-oleyl mannitol phosphate (sodium salt) |
| $C_{15}H_{31}-\overset{O}{\underset{\|}{C}}-O-CH_2-CH_2-\overset{O}{\underset{ONa}{S}}=O$ | β-Hydroxyethanesulphonic acid palmitate (sodium salt) |
| $C_{18}H_{37}-\overset{O}{\underset{ONa}{S}}=O$ | Octadecane sulphonic acid (sodium salt) |
| $CH_3-(CH_2)_{10}-CH_2-O-CH_2-CH_2-O-CH_2-CH_2-\overset{O}{\underset{ONa}{S}}=O$ | |

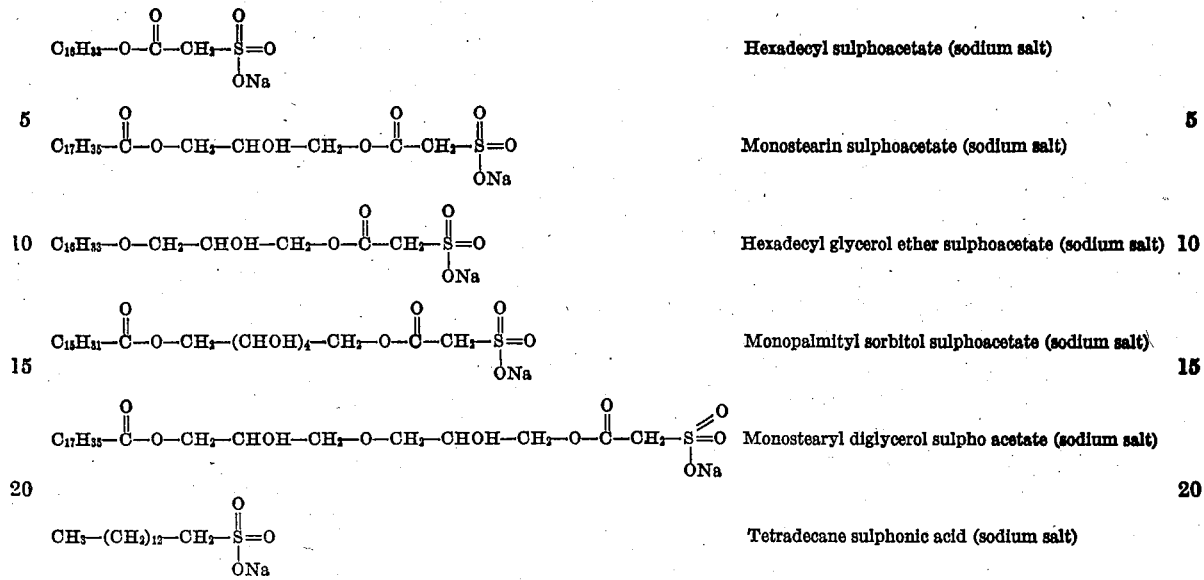

While the illustrative examples represent single substances, in general it is advantageous in practice to prepare and employ mixtures. Methods of preparation resulting in suitable mixtures of substances have been given.

The improving agents of my invention may be added directly to the cake batter as it is mixed. Preferably, however, these materials are incorporated in some of the ingredients going into the flour batter, as for example, they may be incorporated into the shortening with good results. In practice, I may add one of the improvers of my invention to the shortening employed to the extent of about one to five percent by weight of the shortening, depending upon the potency of the material used. In general, a given lipophile group being present, the amount of material used may be decreased as the hydrophyllic properties increase.

One type of material that can be used with very good results in shortening is that prepared by first producing a mixture of polyglycerols by polymerizing glycerine by any suitable method; esterifying with a single fatty acid or a mixture of fatty acids derived from natural vegetable and/or animal oil and fats to produce a mixture of esters having at least one free OH group; and replacing at least one OH group with a sulphate radical. Material of this character may be employed very satisfactorily to improve the character of the shortening such that when the shortening is employed in the production of a flour batter, the improved results previously referred to are obtained. A cake made with this shortening has a better texture and grain, the ratio of moisture and sugar to flour may be increased, and keeping qualities are enhanced.

In practicing the invention, the improved shortening may be produced separately and sold to bakers, or the new improvers may be sold separately and added to the shortening or other ingredient by the baker to facilitate distribution throughout the batter. When a separate shortening is produced, the substances of my invention may be formed in the shortening, or they may be produced separately, and added to the shortening. In the former case, a shortening such as a partially hydrogenated vegetable oil (melting point approximately 95 to 105° F.) is treated with a proportion of glycerine and heated under conditions to re-esterify a portion of the oil and produce essentially a mixture of di- and tri-glycerides with possibly a trace of mono-glycerides. The product so prepared is then sulfated to form the sulphuric acid ester at the free hydroxy groups. Another method is to partially saponify an oil or fat to produce a mixture including some mono- and di-fatty acid esters with free OH groups, and then to sulphate the resulting product to esterify the free OH groups and form a mixture including double glycerine esters having fatty acid lipophile and sulphate hydrophile groups.

According to my present practice of the invention, I prefer to form the improving substances quite apart from the shortening, and then disperse a proportion thereof in a shortening of either animal or vegetable origin having a melting point not appreciably greater than 100° F. The exact proportion of the improving substance used in the shortening depends upon the character of the substance and the results to be obtained. For most substances and for most purposes, a proportion ranging from 1 to 5% based on the shortening is adequate, but considerably greater proportions may be used.

As an example of the use of my invention, 15 pounds of flour are creamed together with 7 pounds of shortening containing about 3% mixed higher fatty acid polyglyceride sulphate ammonium salt of the character described hereinabove. About 20¾ lbs. of granulated sugar, ⅜ lbs. of salt and 14 oz. of baking powder are all mixed together homogeneously and 4½ lbs. of milk added. This is then added to the creamed flour shortening mixture, and a previously prepared mixture of 9¾ lbs. of whole eggs and 10¼ lbs. of milk is then beaten in, until a smooth creamy batter is obtained. The cake is baked in the ordinary way.

The process of mixing may also be changed by creaming 8 lbs. of shortening with 16 lbs. of sugar and 6 oz. salt until smooth. To this is then added slowly, 9¾ lbs. of eggs, and the mixture creamed to the desired lightness. 4¾ lbs. of sugar are then dissolved in 14¾ lbs. of milk and ⅔ of this mixture is added to the above mass and mixed at low speed until the mixture is incorporated. 15 lbs. of flour and 11½ oz. of baking powder, which have been sifted together, are slowly added to the above mass, mixed until smooth, and the rest of the milk and sugar solution added and the entire product mixed until smooth. The cake batter is then baked in the usual manner. With this latter method of mixing, a smaller proportion of baking powder may be used. In the usual commercial formula of yellow layer cake, the amount of sugar used is about 100% based on flour weight. With the use of my improved shortening containing the addition agent, a larger proportion of sugar may be used, namely 120 to 130%, based upon the flour. If less sweetness is desired, a portion of the cane sugar used may be substituted with corn sugar. The usual amount of total liquids, eggs and milk, are about 100% based on the flour in the ordinary commercial cake made with ordinary shortening. With the use of our improved shortening containing the addition agent, a larger proportion of liquids may be used. For example, as much as 140% to 150% of liquids based on the flour may be used by adding more milk. The resultant cake will have an improved texture and body, and better keeping properties.

The shortening prepared is somewhat plastic at ordinary room temperatures, and has the property of imbibing large portions of moisture, thus producing improved results when used with baked flour products, and forming a smoother and much more stable batter emulsion.

A very satisfactory way of proceeding is to incorporate the improving agents of my invention in egg material intended for use in baked flour products such as cakes. I have discovered that the addition of the substances of my invention to egg material produces a new and improved product having improved colloidal and emulsifying properties which render such egg material very suitable for use in industries where egg yolk and similar emulsifying agents are customarily used. The material imparts many valuable properties to cake batters and is particularly well suited for use in this capacity, but it may have other uses. The egg material may be employed without freezing or it may be frozen and used after being thawed. The use of the materials of my invention prevents mixed eggs from clumping after freezing and thawing, so that although the colloidal character of the egg material is modified, it is modified in a direction toward improvement and increased emulsifying power.

If desired, I may make a paste of the improving agent by adding 50 parts of water to 50 parts of the hydrophillic material, for instance melted mono-stearin ammonium sulphate, or to the mixture resulting from re-esterifying a partially hydrogenated cotton seed oil with glycerine or polyglycerol, and then sulphating the free OH group and neutralizing it to form an innocuous salt. The mixture is stirred during cooling to produce a smooth paste and a convenient proportion of this paste is added to the cake batter during mixing and the cake is baked.

As an example of preparing a shortening containing the modifying agent, I melt 97 lbs. of partially hydrogenated cotton seed oil of a clearing point about 100 to 105° F. and add 3 lbs. of ammonium sulphate ester of monostearine or ammonium salt of sulphate ester of a mixture of fatty acid mono- and di-glycerides (prepared from partially hydrogenated cotton seed oil), the entire melted mass being cooled some by passing the flowing mixture onto chilling metal rolls, or by other suitable means. If desired, air or an inert gas such as carbon dioxide may be incorporated and whipped into the chilled product to make it more plastic.

For my lipophile group I may use preferably a high molecular weight fatty radical with eight carbons or more, such as lauryl, oleyl, stearyl, palmityl, cholesteryl, or mixtures of same derived from natural fats or oils, or partially or completely hydrogenated fats or oils such as cotton seed, corn, lard, coconut, sesame, oleo, and similar oils and fats. Corresponding alcohols of these fatty acids may be used, or the esters or ethers of these fatty acids or corresponding alcohols of polyhydroxy substances may be used to react the OH group to produce the sulphate, sulphonic ester and phosphates and their neutralized salts with innocuous cations such as sodium ammonium and calcium.

What I claim as new and desire to protect by Letters Patent of the United States is:

1. A cake batter emulsion including flour, sugar, shortening and aqueous material and having as a constituent thereof a proportion of a hydrophillic lipin having a lipophile group and a non-nitrogenous hydrophile group of a class consisting of phosphates, sulphates, and sulphonic acid derivatives, and their innocuous salts.

2. A cake batter emulsion including flour, sugar, shortening and aqueous material and having as a constituent thereof a relatively high molecular weight carboxylic acid ester of a polyhydroxy substance wherein at least one hydroxy group of the polyhydroxy substance is reacted to produce a non-nitrogenous hydrophillic group of a class consisting of sulphates, phosphates, and sulphonic acid derivatives and their innocuous salts.

3. A cake batter emulsion including flour, sugar, shortening and aqueous material and having as a constituent thereof a proportion of a relatively high molecular weight fatty acid ester of a polyhydric alcohol wherein at least one hydroxy group of the polyhydric alcohol is reacted to produce a non-nitrogenous group of a class consisting of sulphates, phosphates, and sulphonic acid derivatives.

4. A cake batter emulsion comprising flour, sugar, shortening, and aqueous material and having a relatively high molecular weight monofatty acid ester of glycerine wherein at least one remaining hydroxy group of the glycerine is reacted to produce a non-nitrogenous hydrophillic group of a class consisting of sulphates, phosphates, and sulphonic acid derivatives.

5. A cake batter emulsion including flour, sugar, shortening and aqueous material and having as a constituent thereof a sulphonic acid ester of a relatively high molecular weight monovalent alcohol.

6. A cake batter emulsion including flour, sugar, shortening and aqueous material and having as a constituent thereof a relatively high molecular weight fatty acid ester of polyglycerol having at least one free OH group, wherein one of said free OH groups is reacted to produce a non-nitrogenous hydrophillic group of a class consisting of sulphates, phosphates, and sulphonic acid derivatives.

7. A cake batter emulsion including flour, sugar, shortening and aqueous material and having as a constituent thereof an ester of a relatively high molecular weight alcohol and a relatively low molecular weight sulpho-fatty acid.

8. The method of producing an improved cake batter including flour, sugar, shortening and aqueous material which comprises incorporating therewith a proportion of a hydrophillic lipin including a lipophile group and a non-nitrogenous hydrophile group of a class consisting of phosphates, sulphates, and sulphonic acid derivatives and their innocuous salts.

9. The method of producing an improved cake batter including flour, sugar, shortening and aqueous material which comprises incorporating therewith a relatively high molecular weight carboxylic acid ester of a polyhydroxy substance wherein at least one hydroxy group is reacted to produce a non-nitrogenous hydrophillic group of a class consisting of sulphates, phosphates, and sulphonic acid derivatives.

10. The method of producing an improved cake batter including flour, sugar, shortening and aqueous material which comprises incorporating therewith a proportion of a relatively high molecular weight fatty acid ester of a polyhydric alcohol wherein at least one hydroxy group of the polyhydric alcohol is reacted to produce a non-nitrogenous group of a class consisting of sulphates, phosphates, and sulphonic acid derivatives.

11. The method of producing an improved cake batter including flour, sugar, shortening and aqueous material which comprises incorporating therewith a sulphonic acid ester of a relatively high molecular weight mono-valent alcohol.

12. The method of producing an improved cake batter including flour, sugar, shortening and aqueous material which comprises incorporating therewith a relatively high molecular weight fatty acid ester of polyglycerol having at least one free OH group, wherein one of said free OH groups is replaced by a non-nitrogenous hydrophillic group of a class consisting of sulphates, phosphates, and sulphonic acid derivatives.

13. The method of producing an improved cake batter including flour, sugar, shortening, and aqueous material which comprises incorporating therewith an ester of a relatively high molecular weight alcohol and a relatively low molecular weight sulpho-fatty acid.

14. The method of producing an improved cake batter including flour, sugar, shortening, and aqueous material which comprises incorporating therewith a relatively high molecular weight mono-fatty acid ester of glycerine wherein at least one remaining hydroxy group of the glycerine is replaced by a non-nitrogenous hydrophillic group of a class consisting of sulphates, phosphates, and sulphonic acid derivatives.

15. The method of producing an improved cake batter including flour, sugar, shortening, and aqueous material which comprises incorporating with an ingredient of the cake batter a proportion of a hydrophillic lipin including a lipophile group and a non-nitrogenous hydrophile group of a class consisting of phosphates, sulphates, and sulphonic acid derivatives, and employing said material in the preparation of said cake batter.

16. A cake batter emulsion including flour, sugar, shortening, and aqueous material and having as a constituent thereof monostearine ammonium sulphate.

17. A baked flour product including flour, sugar, shortening, and aqueous material and having included therein a proportion of a hydrophillic lipin having a lipophile group and a non-nitrogenous hydrophile group, said hydrophile group being of a class consisting of phosphates, sulphates, sulphonic acid derivatives, and the innocuous salts thereof.

18. A cake batter emulsion including flour, sugar, shortening, and aqueous material and having as a constituent thereof a proportion of a hydrophillic lipin having a relatively high molecular weight lipophile group and a non-nitrogenous hydrophile group of a class consisting of phosphates, sulphates, and sulphonic acid derivatives, and their innocuous salts, the amount of moisture in the cake batter being greater than the amount of flour.

19. A cake batter emulsion including flour, sugar, shortening, and aqueous material and having as a constituent thereof a proportion of a hydrophillic lipin having a relatively high molecular weight lipophile group and a non-nitrogenous hydrophile group of a class consisting of phosphates, sulphates, and sulphonic acid derivatives, and their innocuous salts, the amount of sugar in the cake batter being greater than the amount of flour.

BENJAMIN R. HARRIS.